3,793,437
PROCESS FOR RECOVERING COBALT CARBONYL
Itaru Takasu, Arai, and Masaru Higuchi, Yoshito Hijioka, and Kyozo Arimoto, Saitama, Japan, assignors to Daicel Ltd., Higashi-ku, Osaka, Japan
No Drawing. Filed Sept. 13, 1971, Ser. No. 180,130
Claims priority, application Japan, Sept. 14, 1970, 45/80,809
Int. Cl. C01g 51/02
U.S. Cl. 423—417                7 Claims

ABSTRACT OF THE DISCLOSURE

A process for recovering cobalt characterized by contacting a metallic extracting reagent with an organic liquid containing cobalt carbonyl in the presence of water, carbon monoxide and hydrogen, subsequently heating the obtained aqueous solution of cobalt carbonyl metallic salt in the presence of a mineral acid or an organic acid, an organic solvent which is sparingly soluble in water and carbon monoxide, and extracting cobalt present in the aqueous solution by said organic solvent in the form of dicobalt octacarbonyl.

BACKGROUND OF THE INVENTION

Field of the invention

The present invention relates to a process for recovering cobalt in the form of dicobalt octacarbonyl from organic liquiids containing cobalt carbonyl.

DESCRIPTION OF THE PRIOR ART

It is known to recover cobalt in the form of cobalt carbonyl from an organic liquid containing cobalt carbonyl, for example, organic liquids produced by oxo reactions. In addition to oxo reactions, the recovery of cobalt will have economic significance in reactions wherein cobalt carbonyl is employed either catalytically or stoichiometrically.

As the most typical organic liquid containing cobalt carbonyl, there can be mentioned oxo reaction products. The chemical reaction wherein an olefinic unsaturated hydrocarbon reacts with hydrogen and carbon monoxide to yield oxygenated compounds, particularly aldehydes, is known generally as the hydroformylation or the "oxo" reaction. In industry, the reaction relating to the direct preparation of alcohols by hydrogenating the resulting aldehyde is also referred to as the oxo reaction. Usually cobalt is used as the catalyst for these so-called oxo reactions. Such cobalt catalyst may be introduced in various forms into the oxo reaction system. But it is assumed that, regardless of its original state, the cobalt introduced into the reaction system will be present therein in the form of cobalt carbonyl which will act as a catalyst for the oxo reaction. Consequently it is desirable to recover the cobalt carbonyl in that form from the oxo reaction products for reuse, because the direct introduction of cobalt carbonyl into the reaction system has many advantages, such as (1) elimination of the induction period, which will often occur when cobalt is introduced in other forms, and (2) promotion of the reaction at relatively low temperatures which facilitates easy control of the reaction, affording high quality products and the like.

The following methods of recovering cobalt from the oxo reaction mixture in the form of cobalt carbonyl suitable for reuse are known:

(1) To the oxo reaction mixture is added an oxide, hydroxide or salt of alkali or alkaline earth metals under high pressure water gas, the mixture is treated at high temperatures to convert the cobalt carbonyl into a water-soluble cobalt compound, the said water-soluble cobalt compound is then treated with a mineral acid, and then is recovered in the form of cobalt hydrocarbonyl which can be dissolved in the starting olefin (cf. Japanese patent publication No. 4,731/1965).

(2) The oxo reaction mixture is treated with water under mild conditions, the aqueous extract containing the resulting water-soluble cobalt carbonyl is then decomposed with a mineral acid or an organic acid in the presence of an organic solvent, allowing the cobalt compound to be extracted and separated into the organic solvent layer. (cf. Japanese patent publication No. 29,567/1968).

(3) The reaction product is distilled in an atmosphere of high pressure carbon monoxide, and the cobalt carbonyl remaining in the heavy end is recovered and reused as the catalyst. (cf. Khimi. i. Technol. Tophiv. i. Masel 11 '1966').

However, these methods of recovering cobalt carbonyl for reuse from oxo reaction mixtures are not satisfactory from the viewpoints of the recovery of cobalt, variation of recovery yields depending on the auxiliary starting materials, quality of the final oxo reaction product, quality of the recovered cobalt carbonyl, simplicity and steadiness of the process.

SUMMARY OF THE INVENTION

The process of the present invention is different from those known processes described above in that the organic liquid containing cobalt carbonyl is allowed to contact a metallic extracting reagent in the presence of water, carbon monoxide and hydrogen. The resulting aqueous solution of the metal salt of carbonyl cobaltate is then heated in the presence of a mineral or an organic acid, a water-immiscible organic solvent and carbon monoxide, thus converting the cobalt present in the aqueous solution into dicobalt octacarbonyl which is extracted into the said organic solvent. The dicobalt octacarbonyl is then recovered from the organic solvent for reuse.

Dicobalt octacarbonyl is readily soluble in hydrocarbons, ethers, esters and other organic solvents, but is sparingly soluble in water. Accordingly, in the first step of the process of the present invention, the cobalt carbonyl stably present in an organic liquid, under a suitable partial pressure of carbon monoxide, is contacted with water and a metallic extracting reagent to obtain a metal salt of carbonyl cobaltate dissolved in the aqueous phase. The cobalt carbonyl is thereby separated from the organic liquid. The metallic extracting agent employed in the present invention includes, for example, (1) oxides, hydroxides, carbonates and bicarbonates of alkali and alkaline earth metals, (2) Raney iron, (3) oxides, hydroxides, and weak acid salts of iron, such as iron carbonates, iron bicarbonates, iron sulfides, iron naphthenates, iron lactates and iron acetyl acetonates or (4) zeolites containing ions of alkali metals, alkaline earth metals, cobalt or iron. Said alkali metals include lithium, sodium and potassium, and said alkaline earth metals include beryllium, calcium, magnesium, barium and strontium.

The extraction of cobalt by the metallic extracting agent is conducted by maintaining a pressure of 10 to 500 kg./cm.$^2$, preferably 50 to 300 kg./cm.$^2$, with a mixed gas of carbon monoxide and hydrogen at a volume ratio in the range of 1/1 to 1/2 and at a temperature between 60 and 200° C., preferably between 100 and 170° C.

To the aqueous phase containing the metal salt of carbonyl cobaltate is added a water-immiscible organic solvent and a mineral acid or an organic acid to decompose the metal salt of carbonyl cobaltate. Suitable organic solvents are those which are inert to cobalt hydrocarbonyl and dicobalt octacarbonyl, including, for example, saturated hydrocarbons, aromatic hydrocarbons, ethers, esters and mixtures comprising two or more of these solvents. Saturated hydrocarbons, include, for example, methane, ethane, propane, butane, pentane, hexane, heptane, octane, nonane, decane, gasoline, cyclopentane, cyclohexane and decaline; aromatic hydrocarbons include, for example, benzene, toluene, xylene, tetraline, naphthalene and methylnaphthalene; ethers include, for example, diethyl ether, di-i-propylether, d-n-butylether, di-i-butylether, ethylene glycol dimethyl ether and ethylene glycol diethyl ether; and esters include, for example, methyl acetate, ethyl acetate, propyl acetate and butyl acetate. Mineral acids such as sulfuric, hydrochloric and phosphoric acids and strong organic acids (usually having pKa below 2.5), such as trichloroacetic and p-toluene sulfonic acids, can be employed to decompose the metal salt of carbonyl cobaltate. It is advisable to add more than the equivalent amount of these acids to the metal salt of carbonyl cobaltate to assure the complete decomposition of the metal salt.

The primary decomposition product of the metal salt of carbonyl cobaltate consists mainly of cobalt hydrocarbonyl. Cobalt hydrocarbonyl is strongly acidic and soluble in water, buit it is unstable, as is already known in the art, so that it is liable to decompose further. Dicobalt octacarbonyl is readily soluble in organic solvents. The cobalt hydrocarbonyl is converted into dicobalt octacarbonyl by heating it in the presence of carbon monoxide and a conventional water-immiscible organic solvent, preferably the same organic solvent as the reaction solvent which constituted a component of the original organic liquid. Since the organic solvent used is generally supplied together with the dicobalt octacarbonyl to the subsequent reaction, the kind and amount of the organic solvent should be determined depending on the kind and amount of the reaction solvent desired to be used in the subsequent reaction. Further, free dicobalt octacarbonyl can be obtained by removing the extraction solvent by such known methods as evaporation and concentration, if desired. The amount of the organic solvent used is usually 0.1–10 times, preferably 0.2–5 times, the amount of the aqueous phase containing the metal salt of carbonyl cobaltate. This treatment is preferably carried out at 50–200° C., more preferably at 120–180° C. The partial pressure of carbon monoxide is maintained at a level at which the dicobalt octacarbonyl can be present stably at the temperature of the treatment, generally a partial pressure in the range of 70–200 kg./cm.$^2$. The duration of the treatment is not critical. It depends mostly on the temperature, and in order to shorten the duration, elevated temperatures are preferred. Most of the primary decomposition product, that is, cobalt hydrocarbonyl, is converted into dicobalt octacarbonyl by the treatment. The dicobalt octacarbonyl is extracted into the organic solvent. The organic solvent containing dicobalt octacarbonyl then separates from the aqueous layer on standing. This can be followed by such treatments as drying, dilution or concentration, if desired, and, thereafter, it can be reused in the subsequent reaction.

In the above treatment, the time period during which cobalt is present as cobalt hydrocarbonyl is rather short. Therefore, the corrosion of the apparatus by cobalt hydrocarbonyl and the contamination due to the decomposition products of cobalt hydrocarbonyl are slight. This enables the apparatus and the procedure to be simplified and readily carried out.

The process of the present invention can be applied to the recovery of cobalt in the form of dicobalt octacarbonyl from reaction systems utilizing cobalt hydrocarbonyl or dicobalt octacarbonyl such as the "oxo" reaction, hydroesterification, hydrogenation, isomerization as well as reactions using the metal salts of carbonyl cobaltate.

As the cobalt carbonyl compound which is recovered by the process of the present invention is sensitive to oxygen or oxidizing agents, it is necessary to protect it from contamination by oxygen or oxidizing agents, etc. in order to obtain a high recovery yield. This can be done by means of degassing or replacement of the ambient atmosphere with an inert gas.

The present invention will be further explained with reference to the following illustrative examples, but the scope of the invention will not be limited by them.

EXAMPLE 1

In a 500 ml. stainless steel autoclave provided with a magnetic stirrer were introduced 0.948 g. of dicobalt octacarbonyl, 19.8 g. of propylene, and 110 ml. of toluene. After replacing the internal atmosphere with hydrogen, an equivolume mixture of hydrogen and carbon monoxide was charged into the autoclave at a gauge pressure of 160 kg./cm.$^2$. The contents of the autoclave were heated with stirring until the internal temperature reached 120° C., when heat generation and a pressure drop occurred, and allowed to react for one hour at 130° C. with stirring, then cooled to room temperature. The reaction mixture was transferred into a 300 ml. stainless steel autoclave provided with a magnetic stirrer, in which 1850 mg. of iron naphthenate (iron content 10%) and 60 ml. of water had been previously introduced and the atmosphere of which had been replaced with hydrogen. An equivolume mixture of hydrogen and carbon monoxide was introduced therein, and the contents allowed to react at 130° C., at a gauge pressure of 170 kg./cm.$^2$ for one hour with vigorous stirring. After completion of the reaction, the autoclave was allowed to cool down. After standing the reaction mixture separated into two phases. The lower aqueous layer was found to contain 280 mg. of cobalt in the form of iron salt of carbonyl cobaltate.

The aqueous solution was then transferred into a 300 ml. Hastelloy C autoclave equipped with a magnetic stirrer, in which 75 ml. of toluene and 25.2 ml. of 0.267 N hydrochloric acid had been previously introduced and the atmosphere of which had been replaced with carbon monoxide. Carbon monoxide was charged so as to produce a gauge pressure of 130 kg./cm.$^2$ at 90° C. and the extraction was conducted for one hour with vigorous stirring. The autoclave was then allowed to cool down. After standing, the reaction mixture separated into two phases.

The cobalt contained in the lower aqueous layer was 28 mg., whereas the upper toluene layer was found to contain 256 mg. of cobalt in the form of dicobalt octacarbonyl. When this toluene solution was employed as the catalyst solution for the "Oxo" reaction of propylene, the reaction proceeded at 120° C. and produced butyraldehyde in a high yield.

EXAMPLE 2

The aqueous solution of sodium salt of carbonyl cobaltate obtained by using 351 mg. of sodium carbonate, in place of the iron naphthenate used in Example 1, was transferred into a 300 ml. Hastelloy C autoclave provided with a magnetic stirrer, in which 75 ml. of toluene and 25.7 ml .of 0.267 N hydrochloric acid had been introduced and the atmosphere of which had been replaced with carbon monoxide. The extraction was performed for one hour with vigorous stirring after carbon monoxide had been charged to produce a gauge pressure of 150 kg./cm.$^2$ at 120° C. The autoclave was then allowed to cool down and stand. The extract separated into two phases. The cobalt content in the lower aqueous layer was 26.8 mg. whereas the upper toluene solution contained 293 mg. of cobalt in the form of dicobalt octacarbonyl. Substantially the same result was obtained as in the case of Example 1, when this toluene solution was employed as the catalyst for the oxo reaction of propylene.

EXAMPLE 3

To the oxo reaction mixture of propylene obtained by the same reaction as described in Example 1, there were added by a high pressure pump an aqueous solution containing 422 mg., of ferrous chloride dissolved in 35 ml. of water and an aqueous sodium hydroxide solution comprising 243 mg. of sodium hydroxide and 35 ml. of water. The mixture was heated at 130° C. for one hour with vigorous stirring. Then the autoclave was allowed to cool and stand to separate the reaction mixture into two phases.

The lower aqueous solution was transferred into a 300 ml. Hastelloy C autoclave provided with a magnetic stirrer, in which 75 ml. of toluene and 25.2 ml. of 0.267 N hydrochloric acid had been previously charged and the atmosphere of which had been replaced with carbon monoxide. Carbon monoxide was charged so as to produce a gauge pressure of 140 kg./cm.$^2$ at 90° C. and the extraction was conducted for one hour with vigorous stirring. Then the autoclave was allowed to cool and stand, allowing the extract to separate into two layers. The cobalt content of the lower aqueous layer was 25.6 mg. whereas the cobalt content of the upper toluene layer was 294 mg. in the form of dicobalt octacarbonyl. When this toluene solution was used as the catalyst for the oxo reaction of propylene, substantially the same result was obtained as in the case in Example 1.

What is claimed is:
1. A process for recovering, in the form of dicobalt octacarbonyl, the cobalt carbonyl present as catalyst in an organic liquid reaction product of an oxo, hydroesterification, hydrogenation or isomerization reaction, which comprises:
   (1) contacting said organic liquid reaction product with a metallic extracting reagent in the presence of water, carbon monoxide and hydrogen, to obtain an aqueous solution of metal salt of carbonyl cobaltate,
   (2) mixing said aqueous solution produced by the aforesaid step (1), with
      (a) mineral acid or strong organic acid having a pKa below 2.5, in an amount sufficient to completely decompose said metal salt, and
      (b) an inert water-immiscible organic solvent selected from the group consisting of saturated hydrocarbons, aromatic hydrocarbons, ethers, esters and mixtures thereof, the amount of said organic solvent being from 0.1 to 10 times the amount of the aqueous solution,
   and heating the mixture to a temperature of from 50 to 200° C., in an atmosphere of carbon monoxide at a partial pressure of carbon monoxide in the range of 70 to 200 kg./cm.$^2$ to form dicobalt octacarbonyl in the mixture, and
   (3) recovering from the mixture a solution of dicobalt octacarbonyl dissolved in said organic solvent.
2. The process as claimed in claim 1, in which said organic liquid containing cobalt carbonyl is an oxo reaction product.
3. The process as claimed in claim 1, in which said metallic extracting reagent is selected from the group consisting of oxides, hydroxides and salts of alkali metals and alkaline earth metals; Raney iron, oxides, hydroxides and salts of iron; and zeolites containing ions of alkali metals, alkaline earth metals, cobalt and iron.
4. The process as claimed in claim 1, in which said mineral acid is selected from the group consisting of sulfuric acid, hydrochloric acid and phosphoric acid.
5. The process as claimed in claim 1, in which said organic acid is selected from the group consisting of trichloracetic acid and p-toluene sulfonic acid.
6. The process as claimed in claim 1, in which the amount of said mineral acid or organic acid is more than the equivalent amount of said acid to said metal salt of carbonyl cobaltate.
7. The process as claimed in claim 1, in which the amount of said water-immiscible organic solvent is in the range of 0.2–5 times the amount of said aqueous solution, and said aqueous solution is heated to a temperature of 120–180° C.

References Cited
UNITED STATES PATENTS

| | | | |
|---|---|---|---|
| 3,265,468 | 8/1966 | Farkas et al. | 423—417 |
| 3,188,351 | 6/1965 | Lemke | 260—604 HF |

EARL C. THOMAS, Primary Examiner

U.S. Cl. X.R.
260—604 HF